United States Patent
Nonaka

(10) Patent No.: US 9,190,060 B2
(45) Date of Patent: Nov. 17, 2015

(54) SPEECH RECOGNITION DEVICE AND METHOD, AND SEMICONDUCTOR INTEGRATED CIRCUIT DEVICE

(71) Applicant: SEIKO EPSON CORPORATION, Tokyo (JP)

(72) Inventor: Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/324,771

(22) Filed: Jul. 7, 2014

(65) Prior Publication Data

US 2015/0012275 A1 Jan. 8, 2015

(30) Foreign Application Priority Data

Jul. 4, 2013 (JP) .................. 2013-140426

(51) Int. Cl.
| | | |
|---|---|---|
| G06F 17/28 | (2006.01) | |
| G10L 15/00 | (2013.01) | |
| G10L 13/00 | (2006.01) | |
| G10L 21/00 | (2013.01) | |
| G10L 15/22 | (2006.01) | |
| G10L 15/02 | (2006.01) | |

(52) U.S. Cl.
CPC .................. *G10L 15/22* (2013.01); *G10L 13/00* (2013.01); *G10L 15/02* (2013.01); *G10L 2015/025* (2013.01); *G10L 2015/221* (2013.01); *G10L 2015/228* (2013.01)

(58) Field of Classification Search
CPC ......... G10L 15/26; G10L 17/22; G10L 15/22; G10L 13/00; G10L 13/02; G10L 15/30; G10L 13/043; G06F 17/289; G06F 3/167; G06F 3/16
USPC ............ 704/2, 3, 4, 231, 235, 243, 246, 258, 704/260, 270, 270.1, 275, 277
See application file for complete search history.

(56) References Cited

U.S. PATENT DOCUMENTS

| | | | | |
|---|---|---|---|---|
| 6,061,646 | A * | 5/2000 | Martino et al. | 704/3 |
| 6,308,156 | B1 * | 10/2001 | Barry et al. | 704/268 |
| 6,556,972 | B1 * | 4/2003 | Bakis et al. | 704/277 |
| 7,050,979 | B2 * | 5/2006 | Mizutani et al. | 704/277 |
| 7,454,348 | B1 * | 11/2008 | Kapilow et al. | 704/269 |
| 8,005,681 | B2 * | 8/2011 | Hovestadt et al. | 704/275 |
| 8,527,258 | B2 * | 9/2013 | Kim et al. | 704/3 |

(Continued)

FOREIGN PATENT DOCUMENTS

JP    A-2008-015209    1/2008

*Primary Examiner* — Edgar Guerra-Erazo
(74) *Attorney, Agent, or Firm* — Oliff PLC

(57) ABSTRACT

A semiconductor integrated circuit device for speech recognition includes a scenario setting unit that receives a command designating scenario flow information and selects prescribed speech reproduction data in a speech reproduction data storage and a prescribed conversion list, in accordance with the scenario flow information, a standard pattern extraction unit that extracts a standard pattern corresponding to at least part of individual words or sentences included in the prescribed conversion list from a speech recognition database, a speech signal synthesizer that synthesizes an output speech signal, a signal processor that generates a feature pattern representing the distribution state of the frequency component of an input speech signal, and a match detector that compares the feature pattern with the standard pattern and outputs a speech recognition result.

11 Claims, 11 Drawing Sheets

(56) References Cited

U.S. PATENT DOCUMENTS

| | | |
|---|---|---|
| 2004/0172257 A1* | 9/2004 | Liqin et al. .................... 704/277 |
| 2004/0243392 A1* | 12/2004 | Chino et al. ...................... 704/7 |
| 2005/0164788 A1* | 7/2005 | Grabiec ......................... 463/35 |
| 2005/0182629 A1* | 8/2005 | Coorman et al. ............. 704/266 |
| 2005/0192095 A1* | 9/2005 | Cheng ............................ 463/35 |
| 2006/0025214 A1* | 2/2006 | Smith ............................. 463/30 |
| 2007/0118377 A1* | 5/2007 | Badino et al. ................. 704/260 |
| 2007/0124142 A1* | 5/2007 | Mukherjee .................... 704/235 |
| 2007/0156410 A1* | 7/2007 | Stohr et al. .................... 704/275 |
| 2007/0294076 A1* | 12/2007 | Shore et al. ....................... 704/2 |
| 2008/0243474 A1* | 10/2008 | Furihata et al. ................... 704/2 |
| 2009/0204387 A1* | 8/2009 | Okada ............................... 704/3 |

* cited by examiner

| Speech reproduction number | Content of Question/Message |
|---|---|
| 1 | "What would you like to eat? Please say the name of the dish." |
| 2 | "Would you like that hot or cold?" |
| 3 | "Would you like a large serving or a normal serving?" |
| 4 | "Thank you" |

FIG. 3

| Conversion list number | Option number | Speech recognition option |
|---|---|---|
| 1 | 1 | udon |
| | 2 | soba |
| | 3 | ramen |
| 2 | 1 | hot |
| | 2 | cold |
| 3 | 1 | large serving |
| | 2 | normal serving |

FIG. 4

| | |
|---|---|
| Number of speech reproduction data | 4 |
| Conversion list number corresponding to speech reproduction 1 | 1 |
| Conversion list number corresponding to speech reproduction 2 | 2 |
| Conversion list number corresponding to speech reproduction 3 | 3 |
| Conversion list number corresponding to speech reproduction 4 | 0 |
| Number of conversion lists | 3 |
| Number of options of conversion list 1 | 3 |
| Speech reproduction number following recognition of option 1 of conversion list 1 | 2 |
| Speech reproduction number following recognition of option 2 of conversion list 1 | 2 |
| Speech reproduction number following recognition of option 3 of conversion list 1 | 3 |
| Number of options of conversion list 2 | 2 |
| Speech reproduction number following recognition of option 1 of conversion list 2 | 3 |
| Speech reproduction number following recognition of option 2 of conversion list 2 | 3 |
| Number of options of conversion list 3 | 2 |
| Speech reproduction number following recognition of option 1 of conversion list 3 | 4 |
| Speech reproduction number following recognition of option 2 of conversion list 3 | 4 |
| Speech reproduction number at time of scenario start | 1 |

FIG. 5

| Phrase number | Content of Phrase |
| --- | --- |
| 1 | "Welcome to the menu guide" |
| 2 | "noodles" |
| 3 | "udon" |
| 4 | "soba" |
| 5 | "ramen" |
| 6 | "set menu" |
| 7 | "daily special" |
| 8 | "pork cutlet" |
| 9 | "sashimi" |
| 10 | "dessert" |
| 11 | "soft serve" |
| 12 | "pudding" |
| 13 | "shortcake" |
| 14 | "Please choose from" |
| 15 | "Thank you" |

FIG. 7

| Conversion list number | Option number | Speech recognition options |
|---|---|---|
| 1 | 1 | udon |
| | 2 | soba |
| | 3 | ramen |
| 2 | 1 | daily special |
| | 2 | pork cutlet |
| | 3 | sashimi |
| 3 | 1 | soft serve |
| | 2 | pudding |
| | 3 | shortcake |
| 4 | 1 | noodles |
| | 2 | set menu |
| | 3 | dessert |

FIG. 8

| | |
|---|---|
| Number of speech reproduction settings | 2 |
| Number of phrases of speech reproduction 1 | 5 |
| 1st phrase number of speech reproduction 1 | 1 |
| 2nd phrase number of speech reproduction 1 | 3 |
| 3rd phrase number of speech reproduction 1 | 4 |
| 4th phrase number of speech reproduction 1 | 5 |
| 5th phrase number of speech reproduction 1 | 14 |
| Conversion list number corresponding to speech reproduction 1 | 1 |
| Number of phrases of speech reproduction 2 | 1 |
| 1st phrase number of speech reproduction 2 | 15 |
| Conversion list number corresponding to speech reproduction 2 | 0 |
| Number of conversion list settings | 1 |
| Number of options of conversion list 1 | 3 |
| Speech reproduction number following selection of option 1 of conversion list 1 | 2 |
| Speech reproduction number following selection of option 2 of conversion list 1 | 2 |
| Speech reproduction number following selection of option 3 of conversion list 1 | 2 |
| Speech reproduction number at time of scenario start | 1 |

FIG. 9

| | P1:"Welcome to the menu guide" |
|---|---|
| Speech repro-duction 1 | P3:"udon" |
| | P4:"soba" |
| | P5:"ramen" |
| | P14:"Please choose from" |

| | A1:"udon" | → | Speech reproduction 2 | P15:"Thank you" |
|---|---|---|---|---|
| L1 | A2:"soba" | → | Speech reproduction 2 | P15:"Thank you" |
| | A3:"ramen" | → | Speech reproduction 2 | P15:"Thank you" |

| | |
|---|---|
| Number of speech reproduction settings | 5 |
| Number of phrases of speech reproduction 1 | 5 |
| 1st phrase number of speech reproduction 1 | 1 |
| 2nd phrase number of speech reproduction 1 | 2 |
| 3rd phrase number of speech reproduction 1 | 6 |
| 4th phrase number of speech reproduction 1 | 10 |
| 5th phrase number of speech reproduction 1 | 14 |
| Conversion list number corresponding to speech reproduction 1 | 4 |
| Number of phrases of speech reproduction 2 | 4 |
| 1st phrase number of speech reproduction 2 | 3 |
| 2nd phrase number of speech reproduction 2 | 4 |
| 3rd phrase number of speech reproduction 2 | 5 |
| 4th phrase number of speech reproduction 2 | 14 |
| Conversion list number corresponding to speech reproduction 2 | 1 |
| Number of phrases of speech reproduction 3 | 4 |
| 1st phrase number of speech reproduction 3 | 7 |
| 2nd phrase number of speech reproduction 3 | 8 |
| 3rd phrase number of speech reproduction 3 | 9 |
| 4th phrase number of speech reproduction 3 | 14 |
| Conversion list number corresponding to speech reproduction 3 | 2 |
| Number of phrases of speech reproduction 4 | 4 |
| 1st phrase number of speech reproduction 4 | 11 |
| 2nd phrase number of speech reproduction 4 | 12 |
| 3rd phrase number of speech reproduction 4 | 13 |
| 4th phrase number of speech reproduction 4 | 14 |
| Conversion list number corresponding to speech reproduction 4 | 3 |
| Number of phrases of speech reproduction 5 | 1 |
| 1st phrase number of speech reproduction 5 | 15 |
| Conversion list number corresponding to speech reproduction 5 | 0 |
| Number of conversion list settings | 4 |
| Number of options of conversion list 1 | 3 |
| Speech reproduction number following selection of option 1 of conversion list 1 | 5 |
| Speech reproduction number following selection of option 2 of conversion list 1 | 5 |
| Speech reproduction number following selection of option 3 of conversion list 1 | 5 |
| Number of options of conversion list 2 | 3 |
| Speech reproduction number following selection of option 1 of conversion list 2 | 5 |
| Speech reproduction number following selection of option 2 of conversion list 2 | 5 |
| Speech reproduction number following selection of option 3 of conversion list 2 | 5 |
| Number of options of conversion list 3 | 3 |
| Speech reproduction number following selection of option 1 of conversion list 3 | 5 |
| Speech reproduction number following selection of option 2 of conversion list 3 | 5 |
| Speech reproduction number following selection of option 3 of conversion list 3 | 5 |
| Number of options of conversion list 4 | 3 |
| Speech reproduction number following selection of option 1 of conversion list 4 | 2 |
| Speech reproduction number following selection of option 2 of conversion list 4 | 3 |
| Speech reproduction number following selection of option 3 of conversion list 4 | 4 |
| Speech reproduction number at scenario start time | 1 |

SPEECH RECOGNITION DEVICE AND METHOD, AND SEMICONDUCTOR INTEGRATED CIRCUIT DEVICE

BACKGROUND

1. Technical Field

The present invention relates to a speech recognition device and a speech recognition method that, for example, recognize speech and respond or perform processing according to the recognition result. Furthermore, the invention relates to a semiconductor integrated circuit device that is used in such a speech recognition device and speech recognition method.

2. Related Art

Speech recognition is a technology that obtains a recognition result by analyzing an input speech signal and collating a feature pattern obtained as a result of the analysis with standard patterns (also referred to as "templates") that are provided in a speech recognition database based on prerecorded speech signals. While option information in speech recognition generally exists in a speech recognition dictionary, updating the option information during execution of speech recognition processing is problematic because of the time taken to update the speech recognition dictionary.

As a related technology, JP-A-2008-15209 (para. 0009-0012, FIG. 1) discloses a speech recognition device that enables the recognition dictionary of each speech recognition processor to be updated efficiently, without interrupting the speech recognition service. This speech recognition device is described as being a speech recognition device for recognizing speech data received from a user terminal based on a recognition dictionary, including a recognition dictionary storage means in which the recognition dictionary is stored, a plurality of speech recognition processing means for reading out the recognition dictionary from the recognition dictionary storage means, updating a common dictionary area thereof by registering the recognition dictionary, and recognizing speech data based on this recognition dictionary, a speech recognition request reception means for, in response to a speech recognition request, causing one of the speech recognition processing means to perform recognition of speech data, and a dictionary update request reception means for, in response to a dictionary update request, selecting each speech recognition processing means at least once over a plurality of times, and sequentially causing the selected speech recognition processing means to update its recognition dictionary.

According to the speech recognition device of JP-A-2008-15209, each speech recognition processing means is selected for recognition dictionary updating at least once over a plurality of times and its recognition dictionary is updated, thus enabling the speech recognition device as a whole to update the recognition dictionaries of all the speech recognition processing means without interrupting the speech recognition service.

However, even if it thus becomes possible to update the speech recognition dictionary without interrupting the speech recognition service, in the case where a restriction is not placed on the collation range when collating feature patterns obtained by analyzing input speech signals with standard patterns, the number of combinations of feature patterns and standard patterns to be compared will be huge, leading to an increase in processing time, and the increase in possible vocabulary will conceivably make the determination more difficult and give rise to a fall in the recognition rate.

As a countermeasure to this problem, the recognition rate can conceivably be improved through restricting the number of combinations of feature patterns and standard patterns to be compared, by performing speech recognition in accordance with a preset scenario, for example, although in order to set the scenario, it is necessary to either incorporate the flow or the like of the scenario as program code or create program code for controlling an external speech recognition device in the CPU (central processing unit) in which the speech recognition software is installed. However, the program code has to be changed in the CPU when the scenario is changed, requiring much time and many man hours in changing and evaluating the program code, and the like. In view of this, it is an advantage of some aspects of the invention to enable setting, changing and the like of scenarios in speech recognition to be easily realized.

SUMMARY

In order to solve at least one of the abovementioned problems, a semiconductor integrated circuit device according to an aspect of the invention is a semiconductor integrated circuit device that is used in a speech recognition device that issues a question or a message to a user based on speech reproduction data and performs speech recognition processing on speech of the user. The semiconductor integrated circuit device is equipped with a scenario setting unit that receives a command designating scenario flow information representing a relationship between a plurality of the speech reproduction data and a plurality of conversion lists, and, in accordance with the scenario flow information, selects prescribed speech reproduction data from among the plurality of speech reproduction data which are stored in a speech reproduction data storage, and selects a prescribed conversion list from among the plurality of conversion lists which are stored in a conversion list storage, a standard pattern extraction unit that extracts a standard pattern corresponding to at least part of individual words or sentences included in the prescribed conversion list, from a speech recognition database containing standard patterns representing a distribution state of frequency components of a plurality of phonemes that are used in a prescribed language, a speech signal synthesizer that synthesizes an output speech signal based on the prescribed speech reproduction data, a signal processor that extracts the frequency component of an input speech signal by performing a Fourier-transform on the speech signal, and generates a feature pattern representing the distribution state of the frequency component of the speech signal, and a match detector that compares the feature pattern generated from at least part of the speech signal with the standard pattern extracted from the speech recognition database, and outputs a speech recognition result.

With the semiconductor integrated circuit device according to an aspect of the invention, setting and changing of scenarios in speech recognition can be easily realized by transmitting a command designating scenario flow information representing the relationship between a plurality of speech reproduction data and a plurality of conversion lists to the semiconductor integrated circuit device.

Here, a configuration may be adopted in which the scenario setting unit, in one series of speech recognition operations, selects the prescribed speech reproduction data in accordance with the scenario flow information, from among the plurality of speech reproduction data stored in the speech reproduction data storage, and selects the prescribed conversion list set in the scenario flow information, from among the plurality of conversion lists stored in the conversion list storage. In this case, a situation in which the user's reply to a question or message that is issued based on speech reproduction data is predicted to be one of a number of words or sentences can be created, and a conversion list containing those words or sentences can be applied.

Also, a configuration may be adopted in which after the speech signal synthesizer synthesizes an output speech signal based on first speech reproduction data selected by the selected scenario setting unit, the scenario setting unit selects second speech reproduction data set in the scenario flow information in correspondence with the speech recognition result that is output from the match detector. In this case, second speech reproduction data representing a following question or message can be appropriately selected according to the user's reply to a question or message that is issued based on first speech reproduction data.

Furthermore, a configuration may be adopted in which the scenario setting unit selects the prescribed conversion list corresponding to the second speech reproduction data, in accordance with the scenario flow information, from among the plurality of conversion lists. In this case, an appropriate conversion list can be selected in correspondence with the user's reply to a question or message that is issued based on second speech reproduction data.

Also, a configuration may be adopted in which the scenario setting unit receives a command for setting or changing at least one of the speech reproduction data or at least one of the conversion lists, and sets or changes the at least one of the speech reproduction data in the speech reproduction data storage, or sets or changes the at least one of the conversion lists in the conversion list storage. In this case, setting or changing of speech reproduction data or a conversion list following setting and changing of a scenario in speech recognition can be easily realized.

A speech recognition device according to an aspect of the invention is equipped with the semiconductor integrated circuit device according any aspect of the invention, and a controller that transmits the command designating scenario flow information representing the relationship between the plurality of speech reproduction data and the plurality of conversion lists to the semiconductor integrated circuit device. With the speech recognition device according to an aspect of the invention, changes to the program code in the CPU of the controller in the case of changing the scenario flow can be kept to a minimum, and changing of scenarios in speech recognition is facilitated. Also, because the operations of the controller are simplified, a CPU having a simple configuration can be used in the controller.

A speech recognition method according to an aspect of the invention is a speech recognition method that is used in a speech recognition device that issues a question or a message to a user based on speech reproduction data and performs speech recognition processing on speech of the user. The speech recognition method includes (a) receiving a command designating scenario flow information representing a relationship between a plurality of the speech reproduction data and a plurality of conversion lists, (b) in accordance with the scenario flow information, selecting prescribed speech reproduction data from among the plurality of speech reproduction data which are stored in a speech reproduction data storage, and selecting a prescribed conversion list from among the plurality of conversion lists which are stored in a conversion list storage, (c) extracting a standard pattern corresponding to at least part of individual words or sentences included in the prescribed conversion list, from a speech recognition database containing standard patterns representing a distribution state of frequency components of a plurality of phonemes that are used in a prescribed language, (d) synthesizing an output speech signal based on the prescribed speech reproduction data, (e) extracting the frequency component of an input speech signal by performing a Fourier-transform on the speech signal, and generating a feature pattern representing the distribution state of the frequency component of the speech signal, and (f) comparing the feature pattern generated from at least part of the speech signal with the standard pattern extracted from the speech recognition database, and outputting a speech recognition result.

With the speech recognition method according to an aspect of the invention, setting and changing of scenarios in speech recognition can be easily realized by receiving a command designating scenario flow information representing the relationship between a plurality of speech reproduction data and a plurality of conversion lists.

BRIEF DESCRIPTION OF THE DRAWINGS

The invention will be described with reference to the accompanying drawings, wherein like numbers reference like elements.

FIG. 3 shows exemplary questions and messages represented by speech reproduction data.

FIG. 4 shows exemplary conversion lists stored in a conversion list storage.

FIG. 5 shows an exemplary designation command that is transmitted from a host CPU to a scenario setting unit.

FIG. 7 shows exemplary phrases represented by speech reproduction data.

FIG. 8 shows exemplary conversion lists stored in the conversion list storage.

FIG. 9 shows an exemplary first designation command that sets a first speech recognition scenario.

FIG. 10 shows the speech recognition scenario set by the designation command shown in FIG. 9.

FIG. 11 shows an exemplary second designation command that sets a second speech recognition scenario.

DESCRIPTION OF EXEMPLARY EMBODIMENTS

Hereinafter, embodiments of the invention will be described in detail, with reference to the drawings.

Figure 1:
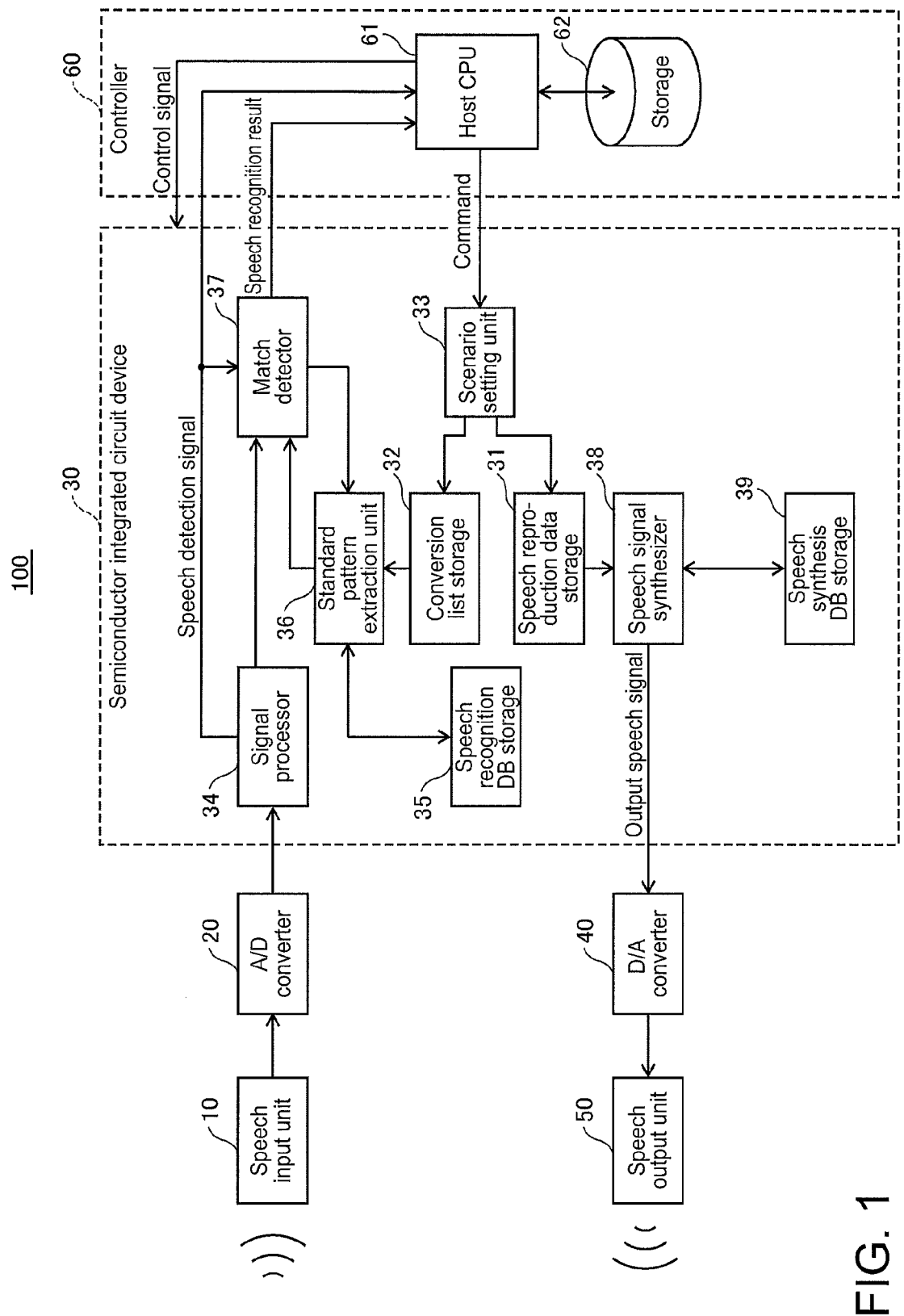
FIG. 1 is a block diagram showing an exemplary configuration of a speech recognition device according to one embodiment of the invention.

FIG. 1 is a block diagram showing an exemplary configuration of a speech recognition device according to one embodiment of the invention. The speech recognition device 100 is mounted in a vending machine, a home electronic device, household equipment, an in-vehicle device (navigation device, etc.), a personal digital assistant or the like, for example. The speech recognition device 100 issues a question or a message to a user based on speech reproduction data, and also recognizes a user's speech using a conversion list containing a plurality of words or sentences that serve as conversion candidates in speech recognition, and responds or performs processing in correspondence with the recognition result.

As shown in FIG. 1, the speech recognition device 100 includes an speech input unit 10, an A/D converter 20, a semiconductor integrated circuit device 30 for speech recognition, a D/A converter 40, a speech output unit 50, and a controller 60. Note that one or more of the speech input unit 10, the A/D converter 20, the D/A converter 40, and the speech output unit 50 may be incorporated in the semiconductor integrated circuit device 30.

The controller 60 includes a host CPU (central processing unit) 61 and a storage 62. The host CPU 61 operates based on software (speech recognition control program) stored in a recording medium of the storage 62. A hard disk, a flexible disk, an MO, an MT, a CD-ROM, a DVD-ROM or the like can be used as the recording medium.

The host CPU 61 controls the speech recognition operations of the semiconductor integrated circuit device 30 for speech recognition, by supplying a control signal to the semiconductor integrated circuit device 30. Also, the host CPU 61 transmits a designation command designating scenario flow information representing the relationship between a plurality of speech reproduction data and a plurality of conversion lists to the semiconductor integrated circuit device 30. Furthermore, the host CPU 61 transmits a setting command for setting or changing (adding or deleting) at least one of the speech reproduction data or at least one of the conversion lists to the semiconductor integrated circuit device 30.

The speech input unit 10 includes a microphone that converts speech into an electrical signal (speech signal), an amplifier that amplifies the speech signal output from the microphone, and a low-pass filter that limits the bandwidth of the amplified speech signal. The A/D converter 20 converts the analog speech signal output from the speech input unit 10 into a digital speech signal (speech data) by sampling the analog speech signal. The speech frequency bandwidth of speech data is 12 kHz, and the bit count is 16 bits, for example.

The semiconductor integrated circuit device 30 includes a speech reproduction data storage 31, a conversion list storage 32, a scenario setting unit 33, a signal processor 34, a speech recognition database (DB) storage 35, a standard pattern extraction unit 36, a match detector 37, a speech signal synthesizer 38, and a speech synthesis database (DB) storage 39. Note that one or more of the speech reproduction data storage 31, the conversion list storage 32, the speech recognition database storage 35 and the speech synthesis database storage 39 may be integrated in an external memory or the like attached to the semiconductor integrated circuit device 30.

The speech reproduction data storage 31 stores a plurality of speech reproduction data that are used in order to issue a question or a message to the user. Also, the conversion list storage 32 stores a plurality of conversion lists that each include the text data of a plurality of words or sentences that serve as conversion candidates in speech recognition. The scenario setting unit 33 receives the designation command designating scenario flow information representing the relationship between a plurality of speech reproduction data and a plurality of conversion lists from the host CPU 61.

The scenario setting unit 33, in one series of speech recognition operations, selects one of the plurality of speech reproduction data stored in the speech reproduction data storage 31, and selects one of the plurality of conversion lists stored in the conversion list storage 32, in accordance with the scenario flow information. Setting and changing of scenarios in speech recognition can thereby be easily realized.

Also, the scenario setting unit 33 receives the setting command for setting or changing at least one of the speech reproduction data or at least one of the conversion lists from the host CPU 61. The scenario setting unit 33 is able to set or change at least one of the speech reproduction data in the speech reproduction data storage 31, or is able to set or change at least one of the conversion lists in the conversion list storage 32, in accordance with the setting command. Setting or changing of speech reproduction data or conversion lists following the setting or changing of scenarios in speech recognition can thereby be easily realized.

The signal processor 34 extracts the frequency component of an input speech signal by performing a Fourier transform on the speech signal, and generates a feature pattern representing the distribution state of the frequency component of the speech signal. The generated feature pattern is output to the match detector 37. Also, the signal processor 34 activates a speech detection signal when the level of the input speech signal exceeds a prescribed value, and outputs the speech detection signal to the match detector 37 and the host CPU 61. It can thereby be determined whether there is a request or reply from the user.

Here, an exemplary technique for deriving a feature pattern from a speech signal will be described. The signal processor 34 performs filter processing on the input speech signal, and enhances the high frequency component. Next, the signal processor 34 divides the time-series speech signal into prescribed periods of time to create a plurality of frames, by applying a Hamming window to the speech waveform represented by the speech signal. Furthermore, the signal processor 34 extracts a plurality of frequency components by performing a Fourier transform on a speech signal on a frame-by-frame basis. Because each frequency component is a complex number, the signal processor 34 derives the absolute value of the individual frequency components.

The signal processor 34 derives the numerical value of a number corresponding to the number of windows, by integrating the extracted frequency components in the windows of the frequency domain determined based on the mel scale. Furthermore, the signal processor 34 takes the logarithm of the derived numerical values, and performs a discrete cosine transform on the logarithmic values. If there are 20 windows in the frequency domain, 20 numerical values will thereby be obtained.

The low-order values among the numerical values thus obtained (for example, 12 values) are called MFCCs (mel-frequency cepstrum coefficients). The signal processor 34 computes the MFCCs on a frame-by-frame basis, concatenates the MFCCs in accordance with a HMM (Hidden Markov model), and derives feature patterns as MFCCs corresponding to the individual phonemes included in the speech signal input in time series.

Here, "phonemes" are elements of sound that are regarded as being the same in a given language. Hereinafter, the case where the language used is Japanese will be described. In Japanese, vowels such as "a", "i", "u", "e" and "o", consonants such as "k", "s", "t" and "n", semivowels "j" and "w", and special mora "N", "Q" and "H" are equivalent to phonemes.

The speech recognition database storage 35 stores a speech recognition database containing standard patterns representing the distribution state of frequency components for the different phonemes that are used in the prescribed language. In the speech recognition database, text data representing the different phonemes are associated with standard patterns serving as option information.

The standard patterns are created in advance using the speech of a large number of speakers (for example, about 200 people). In creating standard patterns, MFCCs are derived from speech signals representing individual phonemes. With MFCCs created using the speech of a large number of speakers, however, there is variation in the respective numerical values.

Accordingly, the standard patterns for the individual phonemes have a spread that includes variation in multi-dimensional space (for example, 12-dimensional space). If a feature pattern generated from a speech signal input to the signal processor 34 is within a range of the spread of a standard pattern, it is determined that both phonemes are matched.

Also, a plurality of speech recognition databases may be used rather than one speech recognition database. For example, the speech recognition database storage 35 may store a plurality of speech recognition databases generated based on speech signals obtained by recording the speech of speakers of a plurality of groups of different ages and sexes. In this case, the match detector 37 can select and use the speech recognition database with respect to which matching of phonemes can be favorably detected, from among the plurality of speech recognition databases.

Alternatively, in the case where the age and sex of the user who is using the speech recognition device can be specified, the speech recognition database storage 35 may store a plurality of speech recognition databases generated based on speech data obtained by recording the speech of speakers of a plurality of groups of different ages and sexes in association with information specifying age and sex. In this case, the match detector 37 is able to select and use one speech recognition database in accordance with the information specifying the age and sex of the user who is using the speech recognition device, from among the plurality of speech recognition databases stored in the speech recognition database storage 35.

The standard pattern extraction unit 36 extracts standard patterns that correspond to at least part of the individual words or sentences included in the conversion list selected by the scenario setting unit 33 from the speech recognition database stored in the speech recognition database storage 35.

The match detector 37 operates while the speech detection signal is activated, and compares a feature pattern generated from at least part of an input speech signal with standard patterns extracted from the speech recognition database to detect for a match therebetween.

For example, the match detector 37 compares a feature pattern generated from the first syllable of the input speech signal with standard patterns corresponding to the first syllables of the individual words or sentences that are represented by the text data included in the conversion list. In the case where there is only one conversion candidate that has the syllable for which a match was detected as its first syllable in the conversion list, the match detector 37 may determine that conversion candidate to be the converted word or sentence. On the other hand, in the case where there are a plurality of conversion candidates that have the syllable for which a match was detected as their first syllable in the conversion list, the match detector 37 may expand the range of the syllables for which a match is to be detected until the conversion candidates are narrowed down to one conversion candidate.

Here, a "syllable" has a single vowel as its fundamental sound, and refers to that vowel on its own, or to a grouping of sounds made up of one or more consonants that come before or after the vowel. A semivowel or a special mora can also constitute a syllable. That is, one syllable is made up of one or more phonemes. "a", "i", "u", "e", "o". "ka", "ki", "ku", "ke", "ko" and the like are equivalent to syllables in Japanese.

For example, the standard pattern corresponding to the syllable "a" is a standard pattern representing the phoneme "a" constituting the syllable "a". Also, the standard pattern corresponding to the syllable "ka" is combination of a standard pattern representing the first phoneme "k" constituting the syllable "ka" and a standard pattern representing the second phoneme "a" constituting the syllable "ka".

In the case where a single syllable of the input speech signal is constituted by one phoneme, detection of a match for that phoneme will mean that a match has been detected for the syllable. On the other hand, in the case where a single syllable of the input speech signal is constituted by a plurality of phonemes, detection of matches for these phonemes will mean that a match has been detected for the syllable.

When a match such as described above is detected between a feature pattern and a standard pattern, the match detector 37 outputs, as a speech recognition result, information specifying a word or sentence having the syllable for which a match was detected among the plurality of words or sentences serving as conversion candidates, such as text data representing the word or sentence, for example. The host CPU 61 is thereby able to recognize a word or sentence corresponding to at least a part of the speech signal input to the semiconductor integrated circuit device 30.

The speech signal synthesizer 38 synthesizes an output speech signal representing speech that is to be output, based on the speech reproduction data selected by the scenario setting unit 33. The speech reproduction data may be text data. In this case, the speech synthesis database stored in the speech synthesis database storage 39 is used in order to synthesize an output speech signal. Speech data representing speech waveforms are included in the speech synthesis database for the different phonemes, and the speech signal synthesizer 38 synthesizes an output speech signal by linking together speech data for the plurality of phonemes included in the words or sentences represented by the text data.

The D/A converter 40 converts the digital speech signal output from the speech signal synthesizer 38 to an analog speech signal. The speech output unit 50 includes a power amplifier that amplifies the analog speech signal that is output from the D/A converter 40, and a speaker that emits speech according to the amplified speech signal. The speaker outputs, as speech, a question or message that is represented by the speech reproduction data selected by the scenario setting unit 33.

The scenario setting unit 33, in one series of speech recognition operations, selects one of the speech reproduction data in accordance with the scenario flow information, from among the plurality of speech reproduction data stored in the speech reproduction data storage 31, and selects one of the conversion lists set in the scenario flow information in correspondence with the selected speech reproduction data, from among the plurality of conversion lists stored in the conversion list storage 32.

In the scenario flow information, conversion lists containing a plurality of words or sentences that serve as conversion candidates are set as replies to questions or messages that are issued based on the individual speech reproduction data. A situation in which the user's reply to a question or message that is issued based on the speech reproduction data is predicted to be one of a number of words or sentences can thereby be created, and a conversion list containing those words or sentences can be applied.

Also, after the speech signal synthesizer 38 has synthesized an output speech signal based on first speech reproduction data selected by the scenario setting unit 33, and a question or message has been issued based on the first speech reproduction data, the scenario setting unit 33 selects second speech reproduction data in correspondence with the speech recognition result output from the match detector 37. Second speech reproduction data representing a following question or message can thereby be appropriately selected, according to the user's reply to the question or message that is issued based on the first speech reproduction data.

Furthermore, the scenario setting unit 33 selects the conversion list corresponding to the second speech reproduction data, in accordance with the scenario flow information, from among the plurality of conversion lists stored in the conversion list storage 32. An appropriate conversion list can thereby be selected, in correspondence with the user's reply to the question or message that is issued based on the second speech reproduction data.

Speech Recognition Method

Next, a speech recognition method according to one embodiment of the invention will be described, with reference to the FIGS. 1 and 2. This speech recognition method is used in a speech recognition device that issues questions or messages to the user based on speech reproduction data, and recognizes the user's speech using conversion lists containing a plurality of words or sentences serving as conversion candidates in speech recognition.

Figure 2:
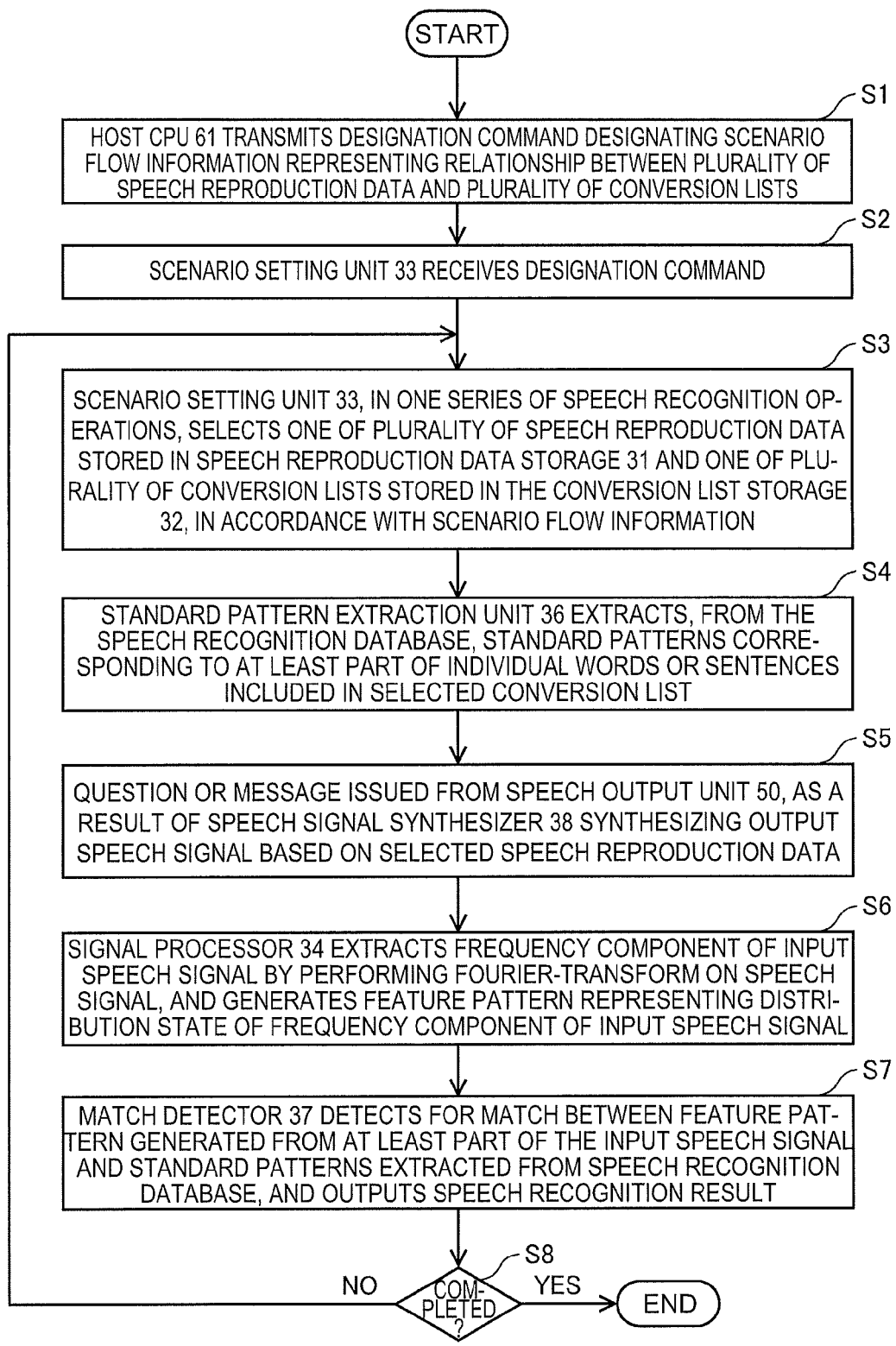
FIG. 2 is a flowchart showing a speech recognition method that is used in the speech recognition device shown in FIG. 1.

FIG. 2 is a flowchart showing the speech recognition method that is used in the speech recognition device shown in FIG. 1. In step S1 of FIG. 2, the host CPU 61 transmits a designation command designating scenario flow information representing the relationship between a plurality of speech reproduction data and a plurality of conversion lists to the semiconductor integrated circuit device 30 for speech recognition, when the semiconductor integrated circuit device 30 is powered on or has been reset.

In step S2, the scenario setting unit 33 of the semiconductor integrated circuit device 30 receives the designation command designating scenario flow information representing the relationship between a plurality of speech reproduction data and a plurality of conversion lists from the host CPU 61.

In step S3, the scenario setting unit 33, in one series of speech recognition operations, selects one of the speech reproduction data from among the plurality of speech reproduction data stored in the speech reproduction data storage 31, and selects one of the conversion lists from among the plurality of conversion lists stored in the conversion list storage 32, in accordance with the scenario flow information.

In step S4, the standard pattern extraction unit 36 extracts standard patterns corresponding to at least part of the individual words or sentences that are included in the conversion list selected in step S3, from the speech recognition database containing standard patterns representing the distribution state of the frequency components of a plurality of phonemes that are used in the prescribed language.

In step S5, a question or message is issued from the speech output unit 50, as a result of the speech signal synthesizer 38 synthesizing an output speech signal based on the speech reproduction data selected in step S3.

When the user speaks in reply to the question or message, the signal processor 34, in step S6, extracts the frequency component of the input speech signal by performing a Fourier-transform on the speech signal, and generates a feature pattern representing the distribution state of the frequency component of the input speech signal. Also, the signal processor 34 activates the speech detection signal.

When the speech detection signal has been activated, the match detector 37, in step S7, detects for a match between the feature pattern generated from at least part of the input speech signal and standard patterns extracted from the speech recognition database, and outputs a speech recognition result specifying the word or sentence for which a match was detected among the plurality of words or sentences serving as conversion candidates.

When a speech recognition result representing a match between a feature pattern and a standard pattern is obtained within a prescribed period after the speech detection signal is activated, the host CPU 61, in step S8, determines whether the series of speech recognition operations have been completed. The processing ends when the series of speech recognition operations have been completed. On the other hand, when the series of speech recognition operations have not been completed, the processing returns to step S3.

According to one embodiment of the invention, using conversion lists in accordance with a scenario in speech recognition enables the standard patterns that are compared with the feature pattern of an input speech signal to be narrowed down to a standard pattern that corresponds to at least part of individual words or sentences that are represented by text data set in the conversion lists.

At this time, setting or changing scenarios in speech recognition can be easily realized by receiving a command designating scenario flow information representing the relationship between a plurality of speech reproduction data and a plurality of conversion lists from the host CPU 61. Accordingly, in the case of changing the scenario flow, changes to the program code in the host CPU 61 of the controller 60 can be kept to a minimum, and changing the scenario in speech recognition is facilitated. Also, because the operations of the controller 60 are simplified, a CPU having a simple configuration can be used in the controller 60.

First Specific Example

Next, a first specific example of the speech recognition operations in the speech recognition device according to one embodiment of the invention will be described. Hereinafter, the case where the speech recognition device shown in FIG. 1 is applied to a food ticket vending machine in a cafeteria will be described.

A menu including a plurality of dish names is displayed on the vending machine. It is assumed that the characters for "udon" (Japanese noodles), "soba" (buckwheat noodles), and "rahmen" (ramen noodles) are displayed on a food menu. In this case, it is predicted the first word spoken by the user will be one of "udon" "soba" and "rahmen" displayed on the food menu.

FIG. 3 shows exemplary questions and messages that are represented by speech reproduction data stored in the speech reproduction data storage. In this example, speech reproduction data representing the contents of four questions and messages is stored in the speech reproduction data storage 31, in correspondence with four speech reproduction numbers. The speech reproduction data includes data representing Roman alphabet notation or kana notation that enables the phonemes included in the questions and messages to be specified.

FIG. 4 shows exemplary conversion lists stored in the conversion list storage. In this example, three conversion lists are stored in the conversion list storage 32, in correspondence with three conversion list numbers. In the individual conversion lists, text data representing a plurality of speech recognition options is set, in correspondence with a plurality of option numbers. The text data includes data representing Roman alphabet notation or kana notation that enables the phonemes included in the speech recognition options to be specified.

FIG. 5 shows an exemplary designation command that is transmitted from the host CPU to the scenario setting unit. The designation command shown in FIG. 5 designate scenario flow information representing the relationship between the plurality of speech reproduction data shown in FIG. 3 and the plurality of conversion lists shown in FIG. 4. In this example, the designation command includes the number of speech reproduction data, conversion list numbers corresponding to a plurality of speech reproduction data, the number of conversion lists, the number of options and speech reproduction numbers following recognition of those options for the individual conversion lists, and the speech reproduction number at scenario start time. Note that the conversion list number "0" represents the end of the scenario.

Figure 6:
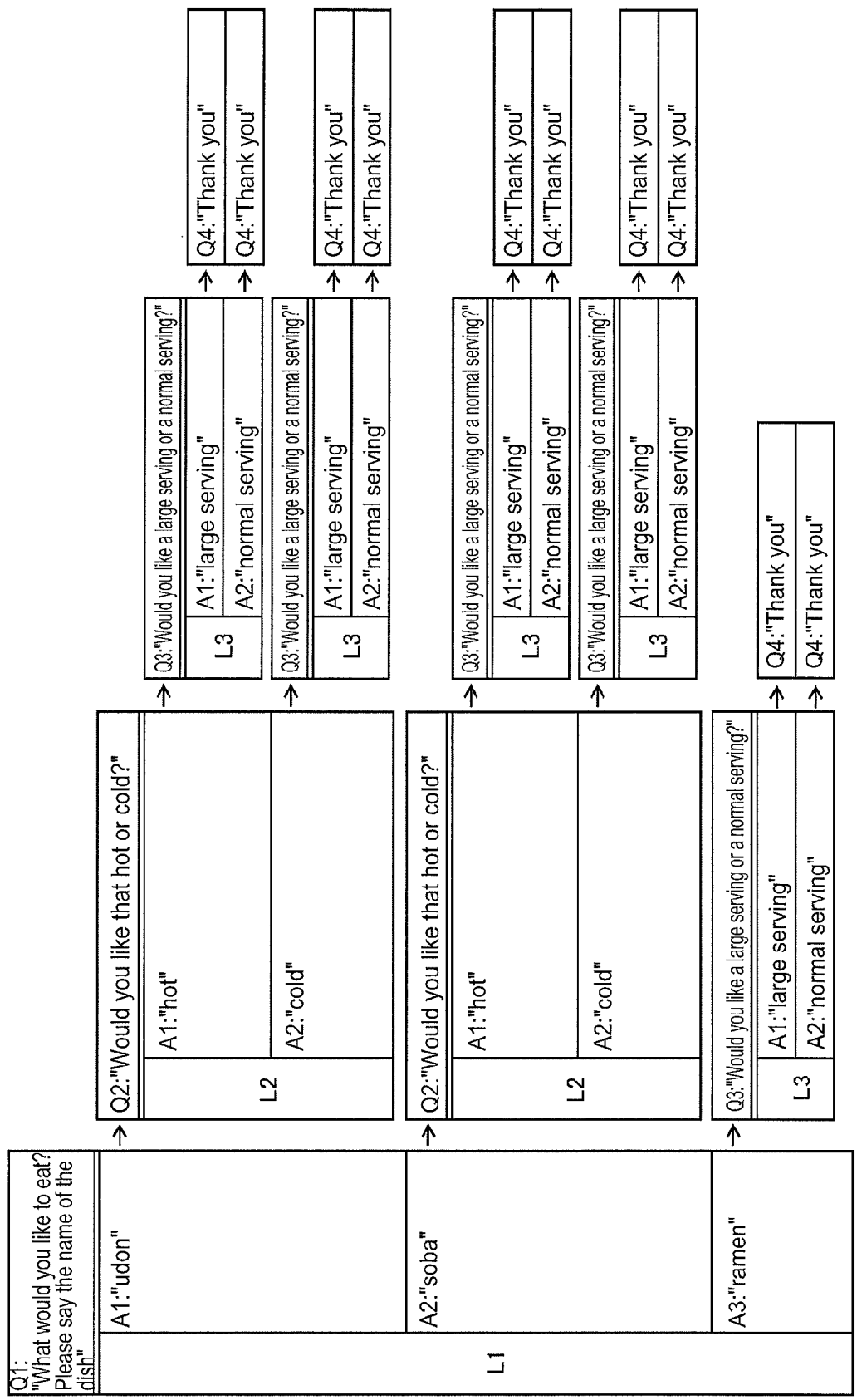
FIG. 6 shows a speech recognition scenario that is set by the designation command shown in FIG. 5.

FIG. 6 shows a speech recognition scenario that is executed in accordance with the scenario flow information designated by the designation command shown in FIG. 5. For example, the host CPU 61 transmits the designation command to the semiconductor integrated circuit device 30 when the vending machine is powered on or has been reset. The scenario setting unit 33 of the semiconductor integrated circuit device 30 starts the speech recognition operations, in accordance with the scenario flow information that is designated by the received designation command.

First, the scenario setting unit 33, in accordance with the speech reproduction number "1" at scenario start time designated by the designation command shown in FIG. 5, selects speech reproduction data Q1 corresponding to speech reproduction number "1" from among the plurality of speech reproduction data stored in the speech reproduction data storage 31.

Also, the scenario setting unit 33, in accordance with the conversion list number "1" corresponding to the speech reproduction number 1 in the designation command shown in FIG. 5, selects a conversion list L1 corresponding to the conversion list number "1" from among the plurality of conversion lists stored in the conversion list storage 32.

The standard pattern extraction unit 36 extracts corresponding standard patterns from the speech recognition database, for the respective phonemes "u", "s-o" and "r-a" included in the first syllables "u", "so", and "ra" of the speech recognition option A1 "udon", the speech recognition option A2 "soba" and the speech recognition option A3 "rahmen" included in the conversion list L1.

Meanwhile, the speech signal synthesizer 38 synthesizes a speech signal based on the speech reproduction data Q1, and outputs the synthesized speech signal to the D/A converter 40. Also, the D/A converter 40 converts the digital speech signal to an analog speech signal, and outputs the analog speech signal to the speech output unit 50. The question/message "What would you like to eat? Please say the name of the dish" is thereby issued from the speech output unit 50.

When the user looks at the menu and says "Soba, please" in response to the question/message issued from the speech output unit 50, the signal processor 34 generates feature patterns representing the distribution state of the frequency components for the respective phonemes "s-o-b-a . . . ".

The match detector 37 detects for a match of the phoneme "s" by comparing the feature pattern of the first phoneme "s" of the first syllable generated by the signal processor 34 with the standard patterns of the first phonemes "u", "s" and "r" of the first syllables extracted from the speech recognition database.

In the case where the phoneme for which a match is detected represents a consonant, the match detector 37 further compares the second phoneme of the first syllable. The match detector 37 detects for a match of the phoneme "o", by comparing the feature pattern of the second phoneme "o" of the first syllable generated by the signal processor 34 with standard patterns of the second phonemes "o" and "a" of the first syllables extracted from the speech recognition database.

A match with the first syllable "so" is thereby detected. If a match is detected for one speech recognition option, a speech recognition result is obtained at this point. On the other hand, if a match is detected for a plurality of speech recognition options, it is not possible to recognized which of the speech recognition options is relevant, and thus the standard pattern extraction unit 36 extracts corresponding standard patterns from the speech recognition database, for the respective phonemes included in the next syllable, and the match detector 37 expands the range of syllables for which a match is to be detected.

The match detector 37 outputs a speech recognition result specifying the speech recognition option "soba" that has the first syllable "so" for which a match was detected to the host CPU 61. Information specifying the speech recognition option "soba" includes, for example, the conversion list number "1" and option number "2" shown in FIG. 4, the Japanese notation "soba" of the speech recognition option or part thereof "so", and the Roman alphabet notation "soba" of the phonemes included in the speech recognition option or part thereof "so". The host CPU 61 is thereby able to recognize the speech recognition option "soba" corresponding to at least part of the input speech signal.

When the speech recognition operations for the first time have thus ended, the scenario setting unit 33, in accordance with the speech reproduction number "2", following selection of the option 2 of the conversion list 1 in the designation command shown in FIG. 5, selects speech reproduction data Q2 corresponding to speech reproduction number "2" from among the plurality of speech reproduction data stored in the speech reproduction data storage 31.

Also, the scenario setting unit 33, in accordance with the conversion list number "2" corresponding to the speech reproduction number 2 in the designation command shown in FIG. 5, selects conversion list L2 corresponding to the conversion list number "2" from among the plurality of conversion lists stored in the conversion list storage 32.

The standard pattern extraction unit 36 extracts corresponding standard patterns from the speech recognition database, for the respective phonemes "a" and "t-u" included in the first syllables "a" and "tu" of the speech recognition option A1 "tumetai" (cold) and the speech recognition option A2 "atatakai" (hot) included in the conversion list L2.

Meanwhile, the speech signal synthesizer 38 synthesizes a speech signal based on the speech reproduction data Q2, and outputs the synthesized speech signal to the D/A converter 40. Also, the D/A converter 40 converts the digital speech signal to an analog speech signal, and outputs the analog speech signal to the speech output unit 50. The question "Would you like that hot or cold?" is thereby issued from the speech output unit 50.

If the user says "Hot, please" in response to the question issued from the speech output unit 50, the signal processor 34 generates feature patterns representing the distribution state of the frequency components for the respective phonemes "a-t-a-t-a-k-a-i . . . ".

The match detector 37 detects for a match of the phoneme "a" by comparing the feature pattern of the first phoneme "a" of the first syllable generated by the signal processor 34 with the standard patterns of the first phonemes "a" and "t" of the first syllables extracted from the speech recognition database. A match with the first syllable "a" is thereby detected.

The match detector 37 outputs a speech recognition result specifying the speech recognition option "atatakai" having the first syllable "a" for which a match was detected to the host CPU 61. The host CPU 61 is thereby able to recognize the speech recognition option "atatakai" corresponding to at least part of the input speech signal.

When the speech recognition operations have thus been completed for the second time, the scenario setting unit 33, in accordance with the speech reproduction number "3" following selection of option 1 of the conversion list 2 in the designation command shown in FIG. 5, selects speech reproduction data Q3 corresponding to the speech reproduction number "3" from among the plurality of speech reproduction data stored in the speech reproduction data storage 31.

Also, the scenario setting unit 33, in accordance with the conversion list number "3" corresponding to the speech reproduction number 3 in the designation command shown in FIG. 5, selects conversion list L3 corresponding to the conversion list number "3" from among the plurality of conversion lists stored in the conversion list storage 32.

The standard pattern extraction unit 36 extracts corresponding standard patterns for the respective phonemes "o" and "h-u" included in the first syllables "o" and "hu" of the speech recognition option A1 "ohmori" (large serving) and the speech recognition option A2 "hutu" (normal serving) included in the conversion list L3 from the speech recognition database.

Meanwhile, the speech signal synthesizer 38 synthesizes a speech signal based on the speech reproduction data Q3, and outputs the synthesized speech signal to the D/A converter 40. Also, the D/A converter 40 converts the digital speech signal to an analog speech signal, and outputs the analog speech signal to the speech output unit 50. The question "Would you like a large serving or a normal serving?" is thereby issued from the speech output unit 50.

When the user says in response to the question issued from the speech output unit 50, "Large serving, please", the signal processor 34 generates feature patterns representing the distribution state of the frequency components for the respective phonemes "o-H-m-o-r-i . . . ".

The match detector 37 detects for a match of the phoneme "o" by comparing the feature pattern of the first phoneme "o" of the first syllable generated by the signal processor 34 with the standard patterns of the first phonemes "o" and "h" of the first syllables extracted from the speech recognition database. A match with the first syllable "o" is thereby detected.

The match detector 37 outputs a speech recognition result specifying the speech recognition option "ohmori" having the first syllable "o" for which a match was detected to the host CPU 61. The host CPU 61 is thereby able to recognize the speech recognition option "ohmori" corresponding to at least part of the input speech signal.

When the speech recognition operations have thus been completed for the third time, the scenario setting unit 33, in accordance with the speech reproduction number "4" following selection of option 1 of the conversion list 3 in the designation command shown in FIG. 5, selects speech reproduction data Q4 corresponding to the speech reproduction number "4" from among the plurality of speech reproduction data stored in the speech reproduction data storage 31.

The speech signal synthesizer 38 synthesizes a speech signal based on the speech reproduction data Q4, and outputs the synthesized speech signal to the D/A converter 40. Also, the D/A converter 40 converts the digital speech signal to an analog speech signal, and outputs the analog speech signal to the speech output unit 50. The message "Thank you" is thereby issued from the speech output unit 50.

The scenario setting unit 33 ends the series of speech recognition operations in accordance with the conversion list number "0" corresponding to the speech reproduction number 4 in the designation command shown in FIG. 5. Thereafter, the vending machine designates the amount of money required to purchase a food ticket through display on a display unit. When the user has put the designated amount in the vending machine, the vending machine presents a food ticket.

Speech recognition operations are also performed in accordance with the speech recognition scenario shown in FIG. 6 in the case where the user makes a selection other than the above.

Second Specific Example

Next, a second example of the speech recognition operations in the speech recognition device according to one embodiment of the invention will be described. In the second example, the speech recognition scenario is changed by a designation command, according to differences in the menus of a specialty noodle shop offering a limited menu and a family noodle shop offering a wide menu in which food ticket vending machines are installed.

FIG. 7 shows exemplary phrases that are represented by speech reproduction data stored in the speech reproduction data storage. One sentence is constituted by combining a plurality of phrases. In this example, speech reproduction data representing the contents of 15 phrases is stored in the speech reproduction data storage 31, in correspondence with 15 phrase numbers.

FIG. 8 shows exemplary conversion lists stored in the conversion list storage. In this example, four conversion lists are stored in the conversion list storage 32, in correspondence with four conversion list numbers. In the respective conversion lists, text data representing a plurality of speech recognition options is set in correspondence with a plurality of option numbers.

First Speech Recognition Scenario

FIG. 9 shows an exemplary first designation command for setting a first speech recognition scenario. The first speech recognition scenario, which is executed in the specialty noodle shop, is set by the first designation command. The first designation command designates scenario flow information representing the relationship between the plurality of speech reproduction data shown in FIG. 7 and the plurality of conversion lists shown in FIG. 8.

As shown in FIG. 9, the first designation command includes the number of speech reproduction settings, the number of phrases, phase numbers and conversion list numbers corresponding to the speech reproductions for the individual speech reproductions, the number of conversion list settings, the number of options and speech reproduction numbers following recognition of those options for the individual conversion lists, and the speech reproduction number at scenario start time. Note that the conversion list number "0" represents the end of the scenario.

FIG. 10 shows the first speech recognition scenario that is set by the first designation command shown in FIG. 9. First, because the speech reproduction number at scenario start time designated by the designation command shown in FIG. 9 is "1", the scenario setting unit 33, in accordance with the first to fifth phrase numbers "1", "3", "4", "5" and "14" of the speech reproduction 1, selects the speech reproduction data representing the corresponding phrases P1, P3, P4, P5 and P14 from among the plurality of speech reproduction data stored in the speech reproduction data storage 31.

Also, the scenario setting unit 33, in accordance with the conversion list number "1" corresponding to the speech reproduction 1 in the designation command shown in FIG. 9, selects the conversion list L1 corresponding to the conversion list number "1" from among the plurality of conversion lists stored in the conversion list storage 32.

The standard pattern extraction unit 36 extracts corresponding standard patterns from the speech recognition database, for the respective phonemes included in the first syllables of the speech recognition option A1 "udon", the speech recognition option A2 "soba" and the speech recognition option A3 "rahmen" included in the conversion list L1.

Meanwhile, the speech signal synthesizer 38 synthesizes a speech signal based on the speech reproduction data representing the phrase P1, P3, P4, P5 and P14, and outputs the synthesized speech signal to the D/A converter 40. Also, the D/A converter 40 converts the digital speech signal to an analog speech signal, and outputs the analog speech signal to the speech output unit 50. The message (speech reproduction 1) "Welcome to the menu guide. Please choose from udon, soba, and ramen" is thereby issued from the speech output unit 50.

When the user says "Udon, please" in response to the message (speech reproduction 1) issued from the speech output unit 50, the signal processor 34 generates feature patterns representing the distribution state of the frequency components for the respective phonemes "u-d-o-N . . . ".

The match detector 37 detects for a match of the phoneme "u" by comparing the feature pattern of the first phoneme "u" of the first syllable generated by the signal processor 34 with the standard patterns of the first phonemes of the first syllables extracted from the speech recognition database. A match with the first syllable "u" is thereby detected. The match detector 37 outputs a speech recognition result specifying the speech recognition option "udon" having the first syllable "u" for which a match was detected to the host CPU 61.

When the speech recognition operations have thus been completed for the first time, the scenario setting unit 33, in accordance with the first phrase number "15" of the speech reproduction 2 given that the speech reproduction number following selection of option 1 of the conversion list 1 in the designation command shown in FIG. 9 is "2", selects the speech reproduction data representing the corresponding phrase P15 from among the plurality of speech reproduction data stored in the speech reproduction data storage 31.

The speech signal synthesizer 38 synthesizes a speech signal based on the speech reproduction data representing the phrase P15, and outputs the synthesized speech signal to the D/A converter 40. Also, the D/A converter 40 converts the digital speech signal to an analog speech signal, and outputs the analog speech signal to the speech output unit 50. The message (speech reproduction 2) "Thank you" is thereby issued from the speech output unit 50. The scenario setting unit 33 ends the series of speech recognition operations, in accordance with the conversion list number "0" corresponding to the speech reproduction 2 in the designation command shown in FIG. 9.

Second Speech Recognition Scenario

FIG. 11 shows an exemplary second designation command for setting a second speech recognition scenario. The second speech recognition scenario, which is executed in a family noodle shop, is set by the second designation command. The second designation command also designates scenario flow information representing the relationship between the plurality of speech reproduction data shown in FIG. 7 and the plurality of conversion lists shown in FIG. 8.

As shown in FIG. 11, the second designation command includes the number of speech reproduction settings, the number of phrases, phase numbers and conversion list numbers corresponding to the speech reproductions for the individual speech reproductions, the number of conversion list settings, the number of options and speech reproduction numbers following recognition of those options for the individual conversion lists, and the speech reproduction number at scenario start time. Note that the conversion list number "0" represents the end of the scenario.

Figure 12:
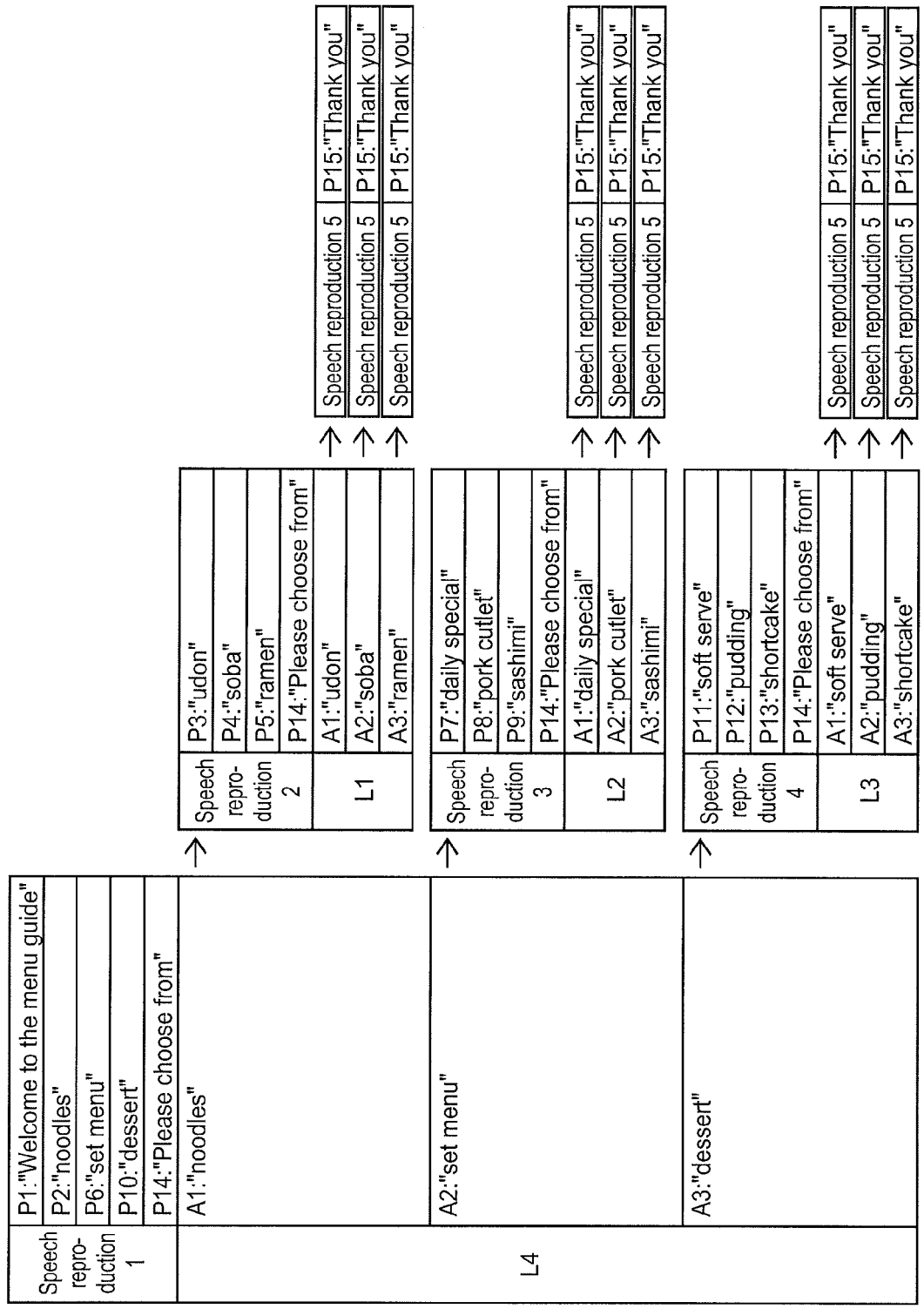
FIG. 12 shows the speech recognition scenario set by the designation command shown in FIG. 11.

FIG. 12 shows the second speech recognition scenario set by the second designation command shown in FIG. 11. First, because the speech reproduction number at the time of the scenario start designated by the designation command shown in FIG. 11 is "1", the scenario setting unit 33, in accordance with the first to fifth phrase numbers "1", "2", "6", "10" and "14" of the speech reproduction 1, selects the speech reproduction data representing the corresponding phrases P1, P2, P6, P10 and P14 from among the plurality of speech reproduction data stored in the speech reproduction data storage 31.

Also, the scenario setting unit 33, in accordance with the conversion list number "4" corresponding to the speech reproduction 1 in the designation command shown in FIG. 11, selects the conversion list L4 corresponding to the conversion list number "4" from among the plurality of conversion lists stored in the conversion list storage 32.

The standard pattern extraction unit 36 extracts corresponding standard patterns from the speech recognition database, for the respective phonemes included in the first syllables of the speech recognition option A1 "menrui" (noodles), the speech recognition option A2 "teishoku" (set menu), and the speech recognition option A3 "dezahto" (dessert) included in the conversion list L4.

Meanwhile, the speech signal synthesizer 38 synthesizes a speech signal based on the speech reproduction data representing the phrase P1, P2, P6, P10 and P14, and outputs the synthesized speech signal to the D/A converter 40. Also, the D/A converter 40 converts the digital speech signal to an analog speech signal, and outputs the analog speech signal to the speech output unit 50. The message (speech reproduction 1) "Welcome to the menu guide. Please choose from noodles, set menu, and dessert" is thereby issued from the speech output unit 50.

When the user says "Dessert, please" in response to the message (speech reproduction 1) issued from the speech output unit 50, the signal processor 34 generates feature patterns representing the distribution state of the frequency components for the respective phonemes "d-e-z-a-H-t-o . . . ".

The match detector 37 detects for a match of the phoneme "d" by comparing the feature pattern of the first phoneme "d" of the first syllable generated by the signal processor 34 with the standard patterns of the first phonemes of the first syllables extracted from the speech recognition database. Because the phoneme for which a match is detected represents a consonant, the match detector 37 detects for a match of the phoneme "e" by further comparing the second phonemes of the first syllables. A match with the first syllable "de" is thereby detected. The match detector 37 outputs a speech recognition result specifying the speech recognition option "dessert" having the first syllable "de" for which a match was detected to the host CPU 61.

When the speech recognition operations have thus been completed for the first time, the scenario setting unit 33, in accordance with the first to fourth phrase numbers "12", "13" and "14" of the speech reproduction 4 given that the speech reproduction number following selection of option 3 of the conversion list 4 in the designation command shown in FIG. 11 is "4", selects the speech reproduction data representing the corresponding phrases P11, P12, P13 and P14 from among the plurality of speech reproduction data stored in the speech reproduction data storage 31.

Also, the scenario setting unit 33, in accordance with the conversion list number "3" corresponding to the speech reproduction 4 in the designation command shown in FIG. 11, selects the conversion list L3 corresponding to the conversion list number "3" from among the plurality of conversion lists stored in the conversion list storage 32.

The standard pattern extraction unit 36 extracts corresponding standard patterns from the speech recognition database, for the respective phonemes included in the first syllables of the speech recognition option A1 "sohuto kurihmu" (soft serve), the speech recognition option A2 "purin" (pudding) and the speech recognition option A3 "shohto kehki" (shortcake) included in the conversion list L3.

Meanwhile, the speech signal synthesizer 38 synthesizes a speech signal based on the speech reproduction data representing the phrase P11, P12, P13 and P14, and outputs the synthesized speech signal to the D/A converter 40. Also, the D/A converter 40 converts the digital speech signal to an analog speech signal, and outputs the analog speech signal to the speech output unit 50. The message (speech reproduction 4) "Please choose from soft serve, pudding, and shortcake" is thereby issued from the speech output unit 50.

When the user says "Soft serve, please" in response to the message (speech reproduction 4) issued from the speech output unit 50, the signal processor 34 generates feature patterns representing the distribution state of the frequency components for the respective phonemes "s-o-h-u-t-o . . . ".

The match detector 37 detects for a match of the phoneme "s" by comparing the feature pattern of the first phoneme "s" of the first syllable generated by the signal processor 34 with the standard patterns of the first phonemes of the first syllables extracted from the speech recognition database. Because the phoneme for which a match is detected represents a consonant, the match detector 37 detects for a match of the phoneme "o" by further comparing the second phonemes of the first syllables. A match with the first syllable "so" is thereby detected. The match detector 37 outputs a speech recognition result specifying the speech recognition option "sohuto kurihmu" having the first syllable "so" for which a match was detected to the host CPU 61.

When the speech recognition operations have thus been completed for the second time, the scenario setting unit 33, in accordance with the first phrase number "15" of the speech reproduction 5 given that the speech reproduction number following selection of option 1 of the conversion list 3 in the designation command shown in FIG. 11 is "5", selects the speech reproduction data representing the corresponding phrase P15 from among the plurality of speech reproduction data stored in the speech reproduction data storage 31.

The speech signal synthesizer 38 synthesizes a speech signal based on the speech reproduction data representing the phrase P15, and outputs the synthesized speech signal to the D/A converter 40. Also, the D/A converter 40 converts the digital speech signal to an analog speech signal, and outputs the analog speech signal to the speech output unit 50. The message (speech reproduction 5) "Thank you" is thereby issued from the speech output unit 50. The scenario setting unit 33 ends the series of speech recognition operations, in accordance with the conversion list number "0" corresponding to the speech reproduction 5 in the designation command shown in FIG. 11.

Although the invention has been described in the above embodiment with regard to specific examples applied to a vending machine, the invention is not limited to this embodiment, and in addition to being applicable to general electronic devices, can be variously modified by a person having ordinary skill in the art within the technical idea of the invention.

This application claims priority from Japanese Patent Application No. 2013-140426 filed in the Japanese Patent Office on Jul. 4, 2013, the entire disclosure of which is hereby incorporated by reference in its entirely.

What is claimed is:

1. A semiconductor integrated circuit device that is used in a speech recognition device that issues a question or a message to a user based on speech reproduction data and performs speech recognition processing on speech of the user, comprising:

a scenario setting unit that receives a command designating scenario flow information representing a relationship between a plurality of the speech reproduction data and a plurality of conversion lists, and, in accordance with the scenario flow information, selects prescribed speech reproduction data from among the plurality of speech reproduction data which are stored in a speech reproduction data storage, and selects a prescribed conversion list from among the plurality of conversion lists which are stored in a conversion list storage;

a standard pattern extraction unit that extracts a standard pattern corresponding to at least part of individual words or sentences included in the prescribed conversion list, from a speech recognition database containing standard patterns representing a distribution state of frequency components of a plurality of phonemes that are used in a prescribed language;

a speech signal synthesizer that synthesizes an output speech signal based on the prescribed speech reproduction data;

a signal processor that extracts the frequency component of an input speech signal by performing a Fourier-transform on the speech signal, and generates a feature pattern representing the distribution state of the frequency component of the speech signal; and a match detector that compares the feature pattern generated from at least part of the speech signal with the standard pattern extracted from the speech recognition database, and outputs a speech recognition result.

2. The semiconductor integrated circuit device according to claim 1, wherein the scenario setting unit, in one series of speech recognition operations, selects the prescribed speech reproduction data in accordance with the scenario flow information, from among the plurality of speech reproduction data stored in the speech reproduction data storage, and selects the prescribed conversion list set in the scenario flow information, from among the plurality of conversion lists stored in the conversion list storage.

3. The semiconductor integrated circuit device according to claim 1, wherein after the speech signal synthesizer synthesizes an output speech signal based on first speech reproduction data selected by the selected scenario setting unit, the scenario setting unit selects second speech reproduction data set in the scenario flow information in correspondence with the speech recognition result that is output from the match detector.

4. The semiconductor integrated circuit device according to claim 3, wherein the scenario setting unit selects the prescribed conversion list corresponding to the second speech reproduction data, in accordance with the scenario flow information, from among the plurality of conversion lists.

5. The semiconductor integrated circuit device according to claim 1, wherein the scenario setting unit receives a command for setting or changing at least one of the speech reproduction data or at least one of the conversion lists, and sets or changes the at least one of the speech reproduction data in the speech reproduction data storage, or sets or changes the at least one of the conversion lists in the conversion list storage.

6. A speech recognition device comprising:

the semiconductor integrated circuit device according to claim 1; and a controller that transmits the command designating scenario flow information representing the relationship between the plurality of speech reproduction data and the plurality of conversion lists to the semiconductor integrated circuit device.

7. A speech recognition device comprising:

the semiconductor integrated circuit device according to claim 2; and a controller that transmits the command designating scenario flow information representing the relationship between the plurality of speech reproduction data and the plurality of conversion lists to the semiconductor integrated circuit device.

8. A speech recognition device comprising:

the semiconductor integrated circuit device according to claim 3; and a controller that transmits the command designating scenario flow information representing the relationship between the plurality of speech reproduction data and the plurality of conversion lists to the semiconductor integrated circuit device.

9. A speech recognition device comprising:

the semiconductor integrated circuit device according to claim 4; and a controller that transmits the command designating scenario flow information representing the relationship between the plurality of speech reproduction data and the plurality of conversion lists to the semiconductor integrated circuit device.

10. A speech recognition device comprising:

the semiconductor integrated circuit device according to claim 5; and a controller that transmits the command designating scenario flow information representing the relationship between the plurality of speech reproduction data and the plurality of conversion lists to the semiconductor integrated circuit device.

11. A speech recognition method that is used in a speech recognition device that issues a question or a message to a user based on speech reproduction data and performs speech recognition processing on speech of the user, comprising:

(a) receiving a command designating scenario flow information representing a relationship between a plurality of the speech reproduction data and a plurality of conversion lists;

(b) in accordance with the scenario flow information, selecting prescribed speech reproduction data from among the plurality of speech reproduction data which are stored in a speech reproduction data storage, and selecting a prescribed conversion list from among the plurality of conversion lists which are stored in a conversion list storage;

(c) extracting a standard pattern corresponding to at least part of individual words or sentences included in the prescribed conversion list, from a speech recognition database containing standard patterns representing a distribution state of frequency components of a plurality of phonemes that are used in a prescribed language;

(d) synthesizing an output speech signal based on the prescribed speech reproduction data;

(e) extracting the frequency component of an input speech signal by performing a Fourier-transform on the speech signal, and generating a feature pattern representing the distribution state of the frequency component of the speech signal; and (f) comparing the feature pattern generated from at least part of the speech signal with the standard pattern extracted from the speech recognition database, and outputting a speech recognition result.

* * * * *